(12) United States Patent
Sugiura et al.

(10) Patent No.: US 7,781,938 B2
(45) Date of Patent: Aug. 24, 2010

(54) ULTRASONIC SENSOR INCLUDING A PIEZOELECTRIC ELEMENT

(75) Inventors: Makiko Sugiura, Hekinan (JP);
Yasuyuki Okuda, Aichi-gun (JP);
Tetsuo Fujii, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 41 days.

(21) Appl. No.: 12/213,894

(22) Filed: Jun. 26, 2008

(65) Prior Publication Data

US 2009/0015105 A1    Jan. 15, 2009

(30) Foreign Application Priority Data

Jul. 11, 2007    (JP)    ............... 2007-181615

(51) Int. Cl.
*H01L 41/08*    (2006.01)
(52) U.S. Cl. ..................................... 310/334
(58) Field of Classification Search ................. 310/334; 600/437, 459
See application file for complete search history.

(56) References Cited

U.S. PATENT DOCUMENTS

| | | | | |
|---|---|---|---|---|
| 4,217,684 A | * | 8/1980 | Brisken et al. | ............. 29/25.35 |
| 4,385,255 A | * | 5/1983 | Yamaguchi et al. | ......... 310/335 |
| 4,431,938 A | * | 2/1984 | Inoue | ........................ 310/348 |
| 4,503,350 A | * | 3/1985 | Nakatani | .................... 310/321 |
| 4,656,384 A | * | 4/1987 | Magori | ........................ 310/334 |
| 5,334,903 A | * | 8/1994 | Smith | ........................ 310/358 |
| 5,995,453 A | * | 11/1999 | Hirata | ........................ 367/155 |
| 6,088,894 A | * | 7/2000 | Oakley et al. | ............. 29/25.35 |
| 6,308,389 B1 | * | 10/2001 | Tezuka | ..................... 29/25.35 |
| 2004/0100163 A1 | | 5/2004 | Baumgartner et al. | |

FOREIGN PATENT DOCUMENTS

| | | |
|---|---|---|
| JP | A-S54-61590 | 5/1979 |
| JP | A-S60-116339 | 6/1985 |
| JP | A-7-322397 | 12/1995 |
| JP | A-H8-340597 | 12/1996 |
| JP | A-2000-176375 | 6/2000 |
| JP | A-2000-253496 | 9/2000 |
| JP | A-2002-186617 | 7/2002 |
| JP | A-2006-234523 | 9/2006 |
| JP | A-2007-235795 | 9/2007 |

OTHER PUBLICATIONS

Office Action dated May 26, 2009 from Japan Patent Office in the corresponding JP Application No. 2007-181615 (and English Translation).

* cited by examiner

*Primary Examiner*—J. SanMartin
(74) *Attorney, Agent, or Firm*—Posz Law Group, PLC

(57) ABSTRACT

An ultrasonic sensor includes a piezoelectric element and an acoustic matching member that are joined together to form an ultrasonic detector base. The ultrasonic detector base is sectioned by a clearance extending in an ultrasonic propagation direction to form multiple ultrasonic detectors arranged in an array. The clearance does not entirely section the ultrasonic detector base so that the ultrasonic detectors are joined together by a portion of the ultrasonic detector base.

15 Claims, 9 Drawing Sheets

200 # ULTRASONIC SENSOR INCLUDING A PIEZOELECTRIC ELEMENT

CROSS REFERENCE TO RELATED APPLICATION

This application is based on and incorporates herein by reference Japanese Patent Application No. 2007-181615 filed on Jul. 11, 2007.

FIELD OF THE INVENTION

The present invention relates to an ultrasonic sensor constructed from a piezoelectric element joined to an acoustic matching member and relates to a method of making the ultrasonic sensor.

BACKGROUND OF THE INVENTION

Conventionally, an ultrasonic sensor has been proposed that includes a piezoelectric element joined to an acoustic matching layer made of resin or the like. In such an ultrasonic sensor, an ultrasonic transmitter emits an ultrasonic wave, the emitted ultrasonic wave is reflected from an object to be detected, and an ultrasonic detector receives the reflected ultrasonic wave. Based on the received ultrasonic wave, the ultrasonic sensor can detect a distance from the object.

When an ultrasonic sensor includes multiple ultrasonic detectors that are arranged in an array, a location and a shape of the object can be detected based on time and phase differences between ultrasonic waves received by the respective ultrasonic detectors.

For example, in an ultrasonic sensor disclosed in JP-A-2006-234523, multiple ultrasonic detectors are arranged in a grid pattern. For another example, in an ultrasonic sensor disclosed in JP-A-S54-61590, a piezoelectric body bonded to an acoustic matching layer is sectioned by a slit into multiple parts that are arranged in an array.

In the ultrasonic sensor disclosed in JP-A-2006-234523, a large number of man-hours are required to arrange the ultrasonic detectors in the grid pattern. Further, it is difficult to cause the ultrasonic detectors to be accurately positioned with respect to each other. In the ultrasonic sensor disclosed in JP-A-S54-61590, although the piezoelectric body is sectioned into multiple parts, the acoustic matching layer is not sectioned. Therefore, an ultrasonic wave propagating through the acoustic matching layer cannot be separated. As a result, noise occurs, and vibration of the ultrasonic wave is damped (i.e., weakened). The noise and the vibration damping may result in a reduction in a detection sensitivity of the ultrasonic sensor.

SUMMARY OF THE INVENTION

In view of the above-described problem, it is an object of the present invention to provide a high-sensitivity ultrasonic sensor having multiple ultrasonic detectors accurately arranged in an array and to provide a method of making the ultrasonic sensor.

According to an aspect of the present invention, an ultrasonic sensor includes a piezoelectric element and acoustic matching member joined to the piezoelectric element. The piezoelectric element detects an ultrasonic wave reflected from a target to be detected. The piezoelectric element includes a piezoelectric body and first and second electrodes that are formed on opposite surfaces of the piezoelectric body. The acoustic matching member has a mounting surface and a receiving surface opposite to the mounting surface. The first electrode of the piezoelectric element is joined to the mounting surface of the acoustic matching member to form an ultrasonic detector base. The receiving surface of the acoustic matching member is exposed to outside to receive the reflected ultrasonic wave. The acoustic matching member causes the ultrasonic wave received at the receiving surface to propagate to the piezoelectric element. The ultrasonic detector base is sectioned into a plurality of ultrasonic detectors by a clearance extending in an ultrasonic wave propagation direction. The ultrasonic wave received at the receiving surface is divided by the clearance and separately detected by the respective ultrasonic detectors. The ultrasonic detectors are joined together by a joint. The joint is formed by a portion of the ultrasonic detector base.

According to an another aspect of the present invention, a method of making an ultrasonic sensor includes preparing a piezoelectric element including a piezoelectric body and first and second electrodes on opposite surfaces of the piezoelectric body, preparing an acoustic matching member having an ultrasonic wave receiving surface and a mounting surface opposite to the receiving surface, joining the first electrode of the piezoelectric element to the mounting surface of the acoustic matching member to form an ultrasonic detector base, and forming a clearance in the ultrasonic detector base to section the ultrasonic detector base into a plurality of ultrasonic detectors. The clearance extends from at least one of the receiving surface and the second electrode in a direction between the receiving surface and the second electrode. The step of forming the clearance includes leaving a portion of the ultrasonic detector base in an extension direction of the clearance. The portion serves as a joint for joining the ultrasonic detectors together.

According to another aspect of the present invention, a method of making an ultrasonic sensor includes preparing a piezoelectric element including a piezoelectric body and first and second electrodes on opposite surfaces of the piezoelectric body, forming a first clearance in the piezoelectric element to section the piezoelectric element into a plurality of piezoelectric elements, preparing an acoustic matching member having an ultrasonic wave receiving surface and a mounting surface opposite to the receiving surface, forming a second clearance in the acoustic matching member to section the acoustic matching member into a plurality of acoustic matching elements, and joining the first electrode of the piezoelectric element to the mounting surface of the acoustic matching member in such a manner that the first and second openings are aligned with each other.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

An ultrasonic sensor 10 according to a first embodiment of the present invention is described below with reference to the drawings. For example, the ultrasonic sensor 10 can be mounted to a vehicle and used as an obstacle sensor.

Figure 1A:
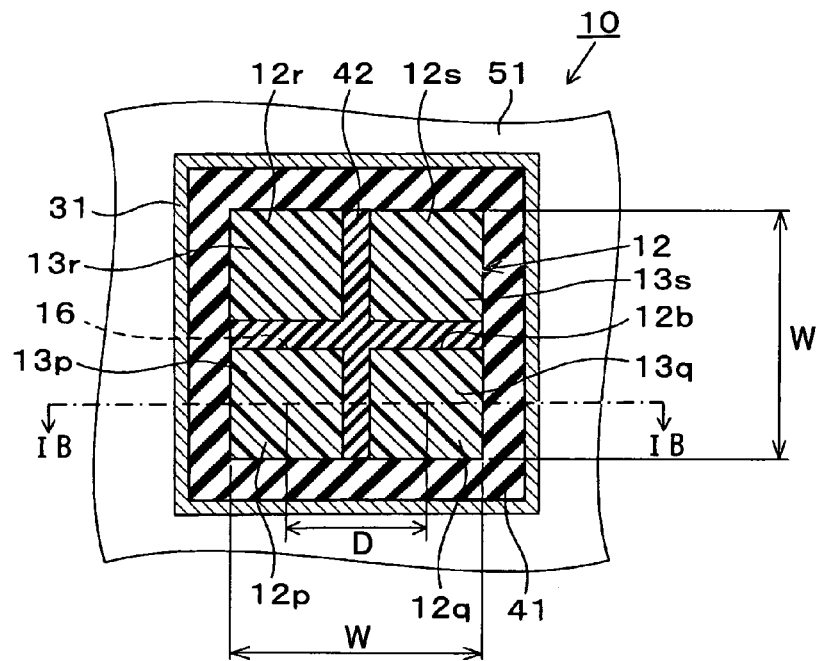
FIG. 1A is a diagram illustrating a top view of an ultrasonic sensor according to a first embodiment of the present invention.
Figure 1B:
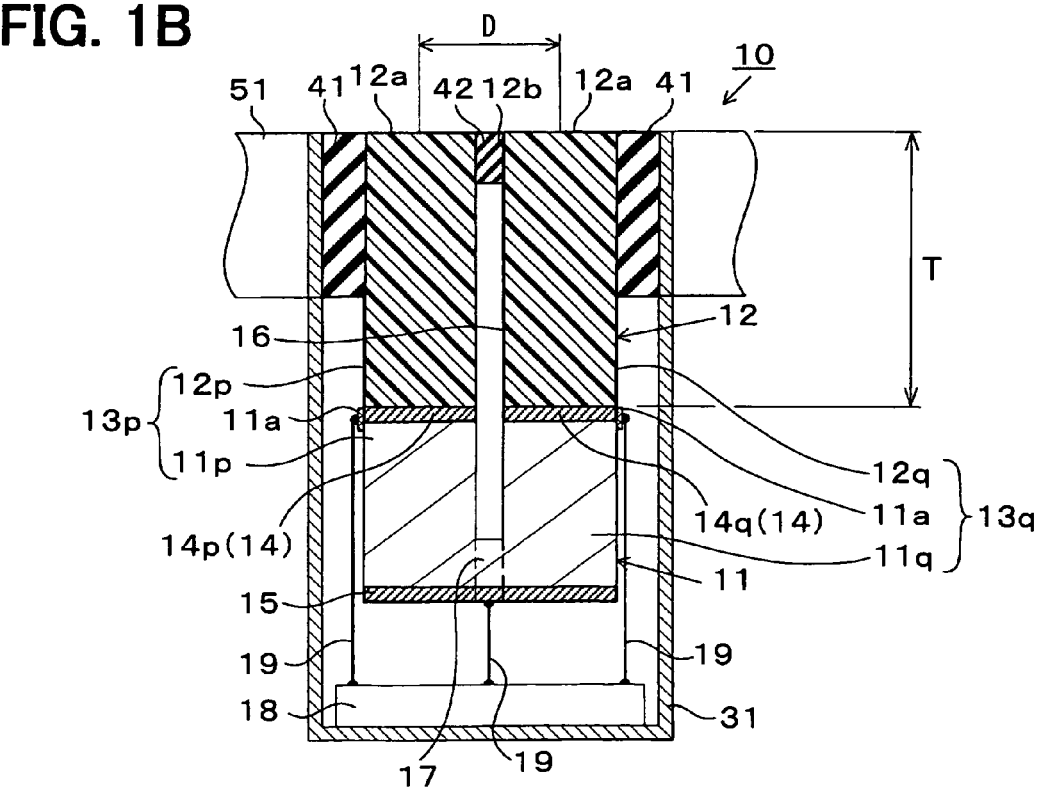
FIG. 1B is a diagram illustrating a cross-sectional view taken along line IB-IB of FIG. 1A.

Referring now to FIGS. 1A, 1B, the ultrasonic sensor 10 includes four ultrasonic detectors (i.e., ultrasonic detecting elements) 13p-13s, a circuit device 18, and a housing 31. The ultrasonic detectors 13p-13s are constructed with a piezoelectric element 11 and an acoustic matching member 12. The ultrasonic detectors 13p-13s are arranged in an array of two rows and two columns and joined together by a joint 17. The circuit device 18 processes voltage signals outputted from the ultrasonic detectors 13p-13s. The ultrasonic detectors 13p-13s and the circuit device 18 are accommodated in the housing 31. In the first embodiment, the ultrasonic sensor 10 is mounted to a bumper 51 of the vehicle and configured to detect a three-dimensional location of the obstacle.

Since the ultrasonic detectors 13p-13s have the same structure, the ultrasonic detector 13p is described below as an example. The ultrasonic detector 13p includes a piezoelectric element 11p and an acoustic matching member 12p joined to the piezoelectric element 11p. The acoustic matching member 12p receives an ultrasonic wave that is emitted forward from the vehicle by an ultrasonic transmitter (not shown) and then reflected from the obstacle ahead of the vehicle. The acoustic matching member 12p causes the received ultrasonic wave to propagate to the piezoelectric element 11p. The piezoelectric element 11p detects the propagating ultrasonic wave. The piezoelectric element 11p is provided with a first electrode 14p and a second electrode 15. The first and second electrodes 14p, 15 are electrically coupled to the circuit device 18 via respective electrical wires 19.

The acoustic matching elements 12p-12s of the ultrasonic detectors 13p-13s are formed from the acoustic matching member 12. The acoustic matching member 12 has a receiving surface 12a for receiving the ultrasonic wave. The receiving surface 12a is provided with a cross-shaped opening 12b. The opening 12b extends in an ultrasonic wave propagation direction (i.e., top-bottom direction of FIG. 1B) to form a cross-shaped slit clearance 16. The acoustic matching member 12 is sectioned into the four acoustic matching elements 12p-12s by the clearance 16. Thus, the acoustic matching elements 12p-12s are arranged in an array of two rows and two columns. Each of the acoustic matching elements 12p-12s has a shape like a rectangular cylinder with a substantially square cross-section. A distance D between centers of adjacent acoustic matching elements 12p-12s is set equal to one-half of a wavelength of the ultrasonic wave.

The acoustic matching member 12 is made of a material having an acoustic impedance that is greater than an acoustic impedance of air and less than an acoustic impedance of the piezoelectric element 11. For example, the acoustic matching member 12 can be made of a resin material such as polycarbonate series, which have high endurance. A side wall of the acoustic matching member 12 near the receiving surface 12a is fixed to an inner side wall of the housing 31 near an opening of the housing 31 through a vibration isolator 41. The vibration insulator 41 helps prevent the ultrasonic wave from being transferred to the acoustic matching member 12 through the housing 31.

A width W of the acoustic matching member 12 is set equal to or less than one-half of a wavelength of an ultrasonic wave in air. A thickness T of the acoustic matching member 12 is set equal to one-quarter of a wavelength of an ultrasonic wave in the acoustic matching member 12. For example, when a frequency of the ultrasonic wave is 65 kilohertz (kHz), the width W is set to about 2.6 millimeters (mm), and the thickness T is set to about 5 mm.

Since the thickness T of the acoustic matching member 12 is set equal to one-quarter of the wavelength of the ultrasonic wave in the acoustic matching member 12, a standing wave is produced in the acoustic matching member 12. Therefore, interference and cancellation between an incident ultrasonic wave into the acoustic matching member 12 and an ultrasonic wave reflected at an interface between the piezoelectric element 11 and the acoustic matching member 12 can be reduced. As a result, the incident ultrasonic wave into the acoustic matching member 12 can efficiently propagate to the piezoelectric element 11.

The opening 12b of the acoustic matching member 12 is filled with a sealing material 42 having an elasticity coefficient less than an elasticity coefficient of the acoustic matching member 12. For example, the sealing material 42 can be made of rubber, gel, or the like. Thus, without affecting the ultrasonic wave propagation, the sealing material 42 prevents foreign matter such as water (moisture) from entering the clearance 16. Alternatively, not only the opening 12b but also the clearance 16 can be filled with the sealing material 42. In such an approach, structural strength of the acoustic matching member 12 is increased so that structural reliability of the ultrasonic sensor 10 can be improved.

The piezoelectric element 11 includes a piezoelectric body and a pair of first and second electrodes 14, 15. The piezoelectric body has a shape like a rectangular cylinder and made of lead titanate zirconate (PZT), for example. The piezoelectric body has a cross-section, the shape of which is equal to a shape of a cross-section of the acoustic matching member 12. The first and second electrodes 14, 15 are formed to opposite surfaces of the piezoelectric body so that the piezoelectric body is sandwiched between the first and second electrodes 14, 15. For example, the first and second electrodes 14, can be formed by plating or sputtering of platinum (Pt) or copper (Cu), or by baking of conductive paste. Since lead titanate zirconate (PZT) has high piezoelectric constant, the piezoelectric element 11 can detect even an ultrasonic wave having low sound pressure. Therefore, detection sensitivity of the ultrasonic sensor 10 can be improved.

The clearance 16 extends from the acoustic matching member 12 partway into the piezoelectric element 11, thereby sectioning an upper portion of the piezoelectric element 11 into four piezoelectric elements 11p-11s that have corresponding shapes to the acoustic matching elements 12p-12s. The clearance 16 does not reach a lower portion of the piezoelectric element 11 so that the piezoelectric elements 11p-11s can be joined together by the lower portion. Thus, the lower portion of the piezoelectric element 11 serves as the joint 17.

As can be seen from FIG. 1B, the first electrode 14 located between the acoustic matching member 12 and the piezoelectric element 11 is sectioned by the clearance 16 into four first electrodes 14p-14s that have corresponding shapes to the acoustic matching elements 12p-12s. The reference numbers 14r, 14s are not shown in the drawings. In contrast, since the clearance 16 does not reach the lower portion of the piezoelectric element 11, the second electrode 15 is not sectioned by the clearance 16. Therefore, whereas the first electrodes 14p-14s are respectively provided to the piezoelectric elements 11p-11s, the second electrode 15 is shared among the piezoelectric elements 11p-11s.

Conductive pads 11a are formed to side surfaces of the piezoelectric elements 11p-11s and electrically coupled to the first electrodes 14p-14s of the piezoelectric elements 11p-11s, respectively. The conductive pads 11a are electrically coupled to the electrical wires 19 coupled to the circuit device 18, which is placed on an inner bottom of the housing 31. The second electrode 15 of the piezoelectric elements 11p-11s is coupled via the electrical wire 19 to the circuit device 18 without the conductive pad 11a. Thus, the piezoelectric elements 11p-11s are electrically coupled to the circuit device 18. Since the second electrode 15 is shared among the piezoelectric elements 11p-11s, the number of the electrical wires 19 required to electrically couple the piezoelectric elements 11p-11s to the circuit device 18 can be reduced. Like the second electrode 15, the first electrodes 14p-14s can be directly coupled to the electrical wires 19 without the conductive pads 11a.

As described above, the ultrasonic sensor 10 according to the first embodiment has a structure in which the acoustic matching member 12 and the piezoelectric element 11 are sectioned by the clearance 16 to form four ultrasonic detectors 13p-13s that are joined together by the joint 17. Thus, the ultrasonic detectors 13p-13s can be integrally formed in such a manner that adjacent ultrasonic detectors 13p-13s are equally spaced at a given distance (i.e., the width of the clearance 16) from each other. Therefore, the ultrasonic detectors 13p-13s can be accurately arranged in an array compared to when ultrasonic detectors are individually formed.

The ultrasonic sensor 10 detects an obstacle as follows. The following example shows a case where the acoustic matching member 12p of the acoustic matching member 12 receives an ultrasonic wave reflected from the obstacle. An ultrasonic wave is transmitted by an ultrasonic transmitter (not shown) and reflected from the obstacle. The reflected ultrasonic wave is received at the receiving surface 12a of the acoustic matching member 12p. The received ultrasonic wave propagates through the acoustic matching member 12p and reaches the piezoelectric element 11p. The piezoelectric element 11p detects the ultrasonic wave and converts the ultrasonic wave to a voltage signal. The voltage signal is transmitted via the circuit device 18 to a processing circuit such an electronic control unit (ECU) of the vehicle. The processing circuit performs calculations based on the voltage signal outputted from the piezoelectric element 11p. Thus, the obstacle can be detected.

In the above case, since the acoustic matching member 12p is separated by the clearance 16 from the other acoustic matching elements 12q-12s, the ultrasonic wave received by the receiving surface 12a of the acoustic matching member 12p does not propagate to the other acoustic matching elements 12q-12s. Therefore, the ultrasonic wave received by the acoustic matching member 12p is transferred to only the piezoelectric element 11p. In other words, the ultrasonic wave received by the acoustic matching member 12p is not transferred to the other piezoelectric elements 11q-11s.

As described above, according to the ultrasonic sensor 10, the receiving surface 12a for receiving the reflected ultrasonic wave is sectioned by the clearance 16 so that the received ultrasonic wave can be separately transferred to and detected by the respective ultrasonic detectors 13p-13s. In such an approach, a good crosstalk characteristic is obtained so that the detection sensitivity of the ultrasonic sensor 10 can be improved.

A distance from the obstacle and a location of the obstacle can be measured based on time and phase differences between the ultrasonic waves received by the ultrasonic detectors 13p-13s. Since the distance D between centers of adjacent acoustic matching elements 12p-12s is set equal to one-half of the wavelength of the ultrasonic wave, the time differences can be detected based on the phase differences. Therefore, the time differences can be accurately detected so that the distance from the obstacle and the location of the obstacle can be accurately measured.

The number and arrangement of the ultrasonic detectors can vary depending on the intended use of the ultrasonic sensor 10. For example, when the ultrasonic sensor 10 has two ultrasonic detectors, the ultrasonic sensor 10 can detect a two-dimensional location of an obstacle. For another example, the ultrasonic sensor 10 can have six ultrasonic detectors that are arranged in an array of three rows and two columns.

Figure 2A:
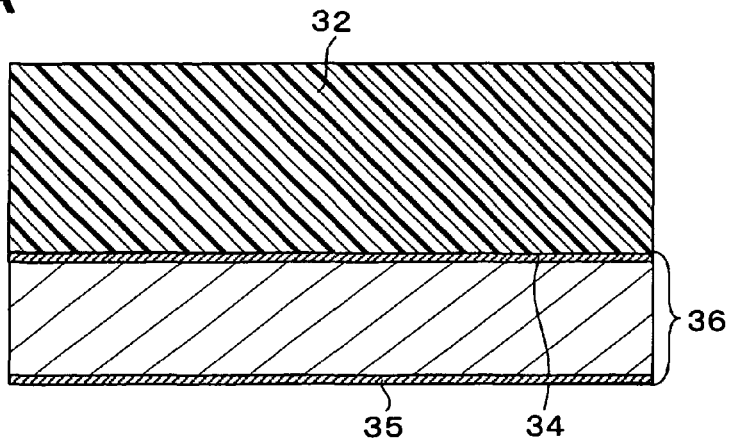
FIGS. 2A-2C are diagrams illustrating a method of making the ultrasonic sensor of FIGS. 1A, 1B.

A method of making the ultrasonic sensor 10 is described below with reference to FIGS. 2A-2C. First, as shown in FIG. 2A, an acoustic matching member material 32 and a piezoelectric element material 36 are prepared. The acoustic matching member material 32 may be, for example, a polycarbonate resin block. Electrodes 34, 35 are preformed on opposite surfaces of the piezoelectric element material 36 by plating or sputtering of platinum (Pt) or copper (Cu), or by baking of conductive paste. The acoustic matching member material 32 is bonded on a surface of the electrode 34, for example, by using an adhesive agent. Thus, the acoustic matching member material 32 and the piezoelectric element material 36 are joined together to form an ultrasonic detector base.

Figure 2B:
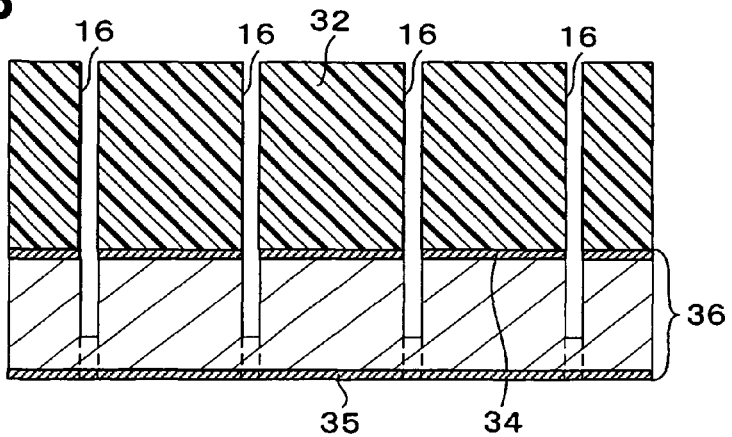

Then, as shown in FIG. 2B, a half-cut dicing is applied to the ultrasonic detector base from a surface of the acoustic matching member material 32 in the ultrasonic wave propagation direction, so that the ultrasonic detector base is half-cut in a grid pattern.

Thus, an opening is formed to the surface of the acoustic matching member material 32, and a clearance 16 extending from the opening in the ultrasonic wave propagation direction is formed. The clearance 16 extends into the piezoelectric element material 36 through the electrode 34 but does not reach the electrode 35. Therefore, a portion of the piezoelectric element material 36 located in front of the clearance 16 serves as the joint 17, by which the ultrasonic detectors 13p-13s are joined together. The joint 17 is formed in a shape that allows the ultrasonic detectors 13p-13s joined together to have adequate structural strength.

Figure 2C:
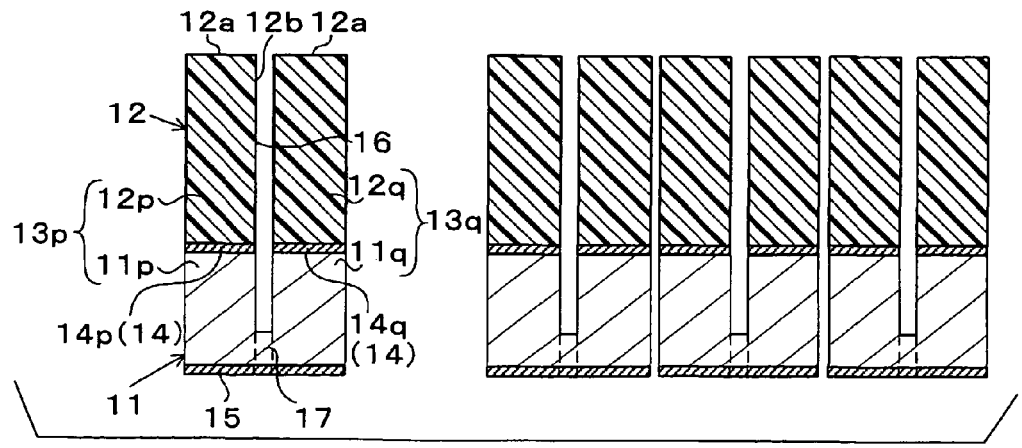

Then, as shown in FIG. 2C, the ultrasonic detector base is cut by dicing along the center between adjacent clearances 16. As a result, the ultrasonic detector base is sectioned into four ultrasonic detectors 13p-13s that are arranged in an array and joined together by the joint 17. Although FIGS. 2A-2C illustrate a case of forming the ultrasonic sensor 10 including four ultrasonic detectors 13p-13s, the number of ultrasonic detectors included in the ultrasonic sensor 10 can be changed by changing a cutting position at which the ultrasonic detector base is cut.

Then, the ultrasonic detectors 13p-13s are electrically coupled to the circuit device 18 through the electrical wires 19 and accommodated in the housing 31. Then, the side wall of the acoustic matching member 12 near the receiving surface 12a is fixed to the inner side wall of the housing 31 near the opening of the housing 31 through the vibration isolator 41. Thus, the ultrasonic sensor 10 shown in FIG. 1 is made.

As described above, according to the manufacturing method of the ultrasonic sensor 10, the clearance 16 is formed by applying the half-cut dicing to the joined body of the acoustic matching member material 32 and the piezoelectric element material 36. Then, the joined body having the clearance 16 is separated by dicing. In such an approach, four ultrasonic detectors 13p-13s joined together by the joint 17 can be formed easily, so that manufacturing cost of the ultrasonic sensor 10 can be reduced. Further, the ultrasonic detectors 13p-13s can be accurately arranged in an array compared to when ultrasonic detectors are individually formed.

The ultrasonic sensor 10 can be modified in various ways. For example, the clearance 16 can section only the acoustic matching member 12 so that the piezoelectric element 11 is not sectioned by the clearance 16. In this case, the first electrode 14 is preformed in separated wiring patterns corresponding to the respective ultrasonic detectors 13p-13s.

The acoustic matching member 12 can be made of a material other than resin. For example, the acoustic matching member 12 can be made of ceramic, glass, or the like, which has an environmental resistance such as a weather resistance.

The piezoelectric element 11 can be made of a material other than lead titanate zirconate (PZT). For example, the piezoelectric element 11 can be made of polyvinylidene-fluoride (PVDF), crystal, zinc oxide, lithium niobate, lithium tantalite, or the like. In particular, when the piezoelectric element 11 is made of polyvinylidene-fluoride (PVDF), a difference in an acoustic impedance between the piezoelectric element 11 and the acoustic matching member 12 can be small, so that the ultrasonic wave can be efficiently transferred from the acoustic matching member 12 to the piezoelectric element 11.

According to the first embodiment, the ultrasonic sensor 10 includes multiple ultrasonic detectors 13p-13s that are arranged in an array. The ultrasonic detectors 13p-13s are constructed with the piezoelectric element 11 and the acoustic matching member 12 that are sectioned by the clearance 16 extending in the ultrasonic wave propagation direction. In such an approach, the ultrasonic wave received at the receiving surface 12a of the acoustic matching member 12 can be separately transferred to and detected by the respective ultrasonic detectors 13p-13s. Therefore, a good crosstalk characteristic is obtained so that the detection sensitivity of the ultrasonic sensor 10 can be improved. Further, the ultrasonic detectors 13p-13s are joined together by the joint 17. Thus, the ultrasonic detectors 13p-13s can be integrally formed in such a manner that adjacent ultrasonic detectors 13p-13s are equally spaced at the given distance from each other. Therefore, the ultrasonic detectors 13p-13s can be accurately arranged in an array compared to when ultrasonic detectors are individually formed.

The distance D between the centers of adjacent acoustic matching elements 12p-12s is set equal to one-half of the wavelength of the ultrasonic wave. In such an approach, the time differences between the received ultrasonic waves can be detected based on the phase differences between the received ultrasonic waves. Therefore, the time differences can be accurately detected so that the distance from the obstacle and the location of the obstacle can be accurately measured.

Since the second electrode 15 is shared among the ultrasonic detectors 13p-13s, the number of the electrical wires 19 required to electrically couple the ultrasonic detectors 13p-13s to the circuit device 18 can be reduced.

The opening 12b of the acoustic matching member 12 is filled with the sealing material 42 having an elasticity coefficient less than an elasticity coefficient of the acoustic matching member 12. Thus, without affecting the ultrasonic wave propagation, the sealing material 42 prevents foreign matter such as water from entering the clearance 16. Further, the sealing material 42 improves the strength of the acoustic matching member 12.

Second Embodiment

An ultrasonic sensor 20 according to a second embodiment of the present invention is described below with reference to FIG. 3. Differences between the first and second embodiments are as follows.

In the first embodiment, the lower portion of the piezoelectric element 11 serves as the joint 17, by which the ultrasonic detectors 13p-13s are joined together. In contrast, in the second embodiment, the upper portion of the piezoelectric element 11 serves as the joint 17.

Figure 3:
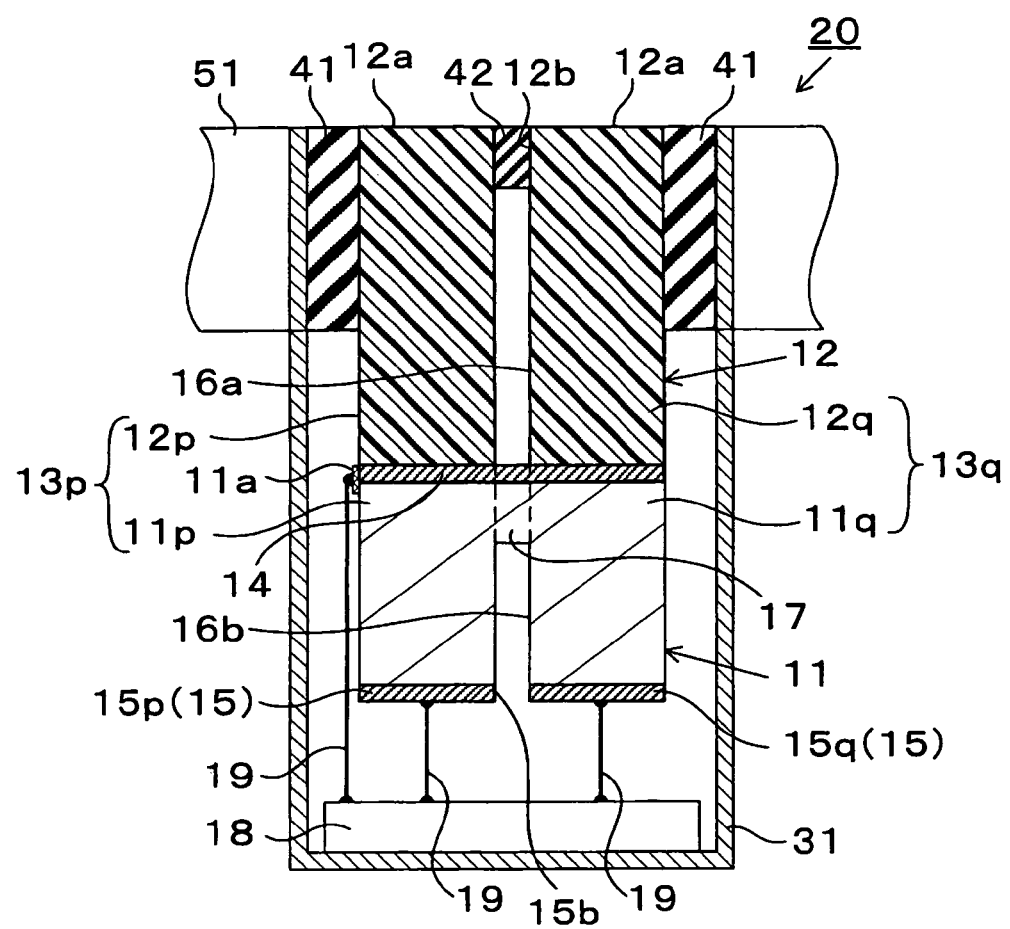
FIG. 3 is a diagram illustrating a cross-sectional view of an ultrasonic sensor according to a second embodiment of the present invention.

As shown in FIG. 3, the receiving surface 12a of the acoustic matching member 12 is provided with a cross-shaped opening 12b. The opening 12b extends in an ultrasonic wave propagation direction (i.e., top-bottom direction of FIG. 3) to form a first clearance 16a. The first clearance 16a extends to just above the first electrode 14 of the piezoelectric element 11. The acoustic matching member 12 is sectioned into four acoustic matching elements 12p-12s by the first clearance 16a. The reference numbers 12r, 12s are not shown in FIG. 3.

The second electrode 15 of the piezoelectric element 11 is provided with a cross-shaped opening 15b corresponding to the opening 12b. The second electrode 15 is sectioned into four second electrodes 15p-15s by the opening 15b. The second electrodes 15p-15s are respectively coupled to the circuit device 18 via the electrical wires 19. The reference numbers 15r, 15s are not shown in FIG. 3.

The opening 15b extends in a direction (i.e., bottom-top direction of FIG. 3) opposite to the ultrasonic wave propagation direction to form a second clearance 16b. The first and second clearances 16a, 16b coincide with each other in the ultrasonic wave propagation direction. The second clearance 16b extends partway into the piezoelectric element 11, thereby sectioning a lower portion of the piezoelectric element 11 into four piezoelectric elements 11p-11s. The second clearance 16b does not reach an upper portion of the piezoelectric element 11 so that the piezoelectric elements 11p-11s can be joined together by the upper portion. Thus, the upper portion of the piezoelectric element 11 serves as the joint 17, by which the ultrasonic detectors 13p-13s are joined together.

The joint 17 is in contact with the first electrode 14. Neither of the first and second clearances 16a, 16b sections the first electrode 14, which is located between the acoustic matching member 12 and the piezoelectric element 11. Whereas the second electrodes 15p-15s are respectively provided to the piezoelectric elements 11p-11s, the first electrode 14 is shared among the piezoelectric elements 11p-11s. Therefore, the number of the electrical wires 19 required to electrically couple the piezoelectric elements 11p-11s to the circuit device 18 can be reduced. It is difficult to connect the electrical wire 19 to the first electrode 14 compared to the second electrode 15, because the first electrode is located between the acoustic matching member 12 and the piezoelectric element 11. Since the first electrode 14 is shared, the first electrode 14 can be easily connected to the circuit device 18 through the electrical wire 19. The second electrodes 15$p$-15$s$ are respectively connected to the circuit device 18 through the electrical wires 19. Thus, the piezoelectric elements 11$p$-11$s$ are connected to the circuit device 18.

Figure 4:
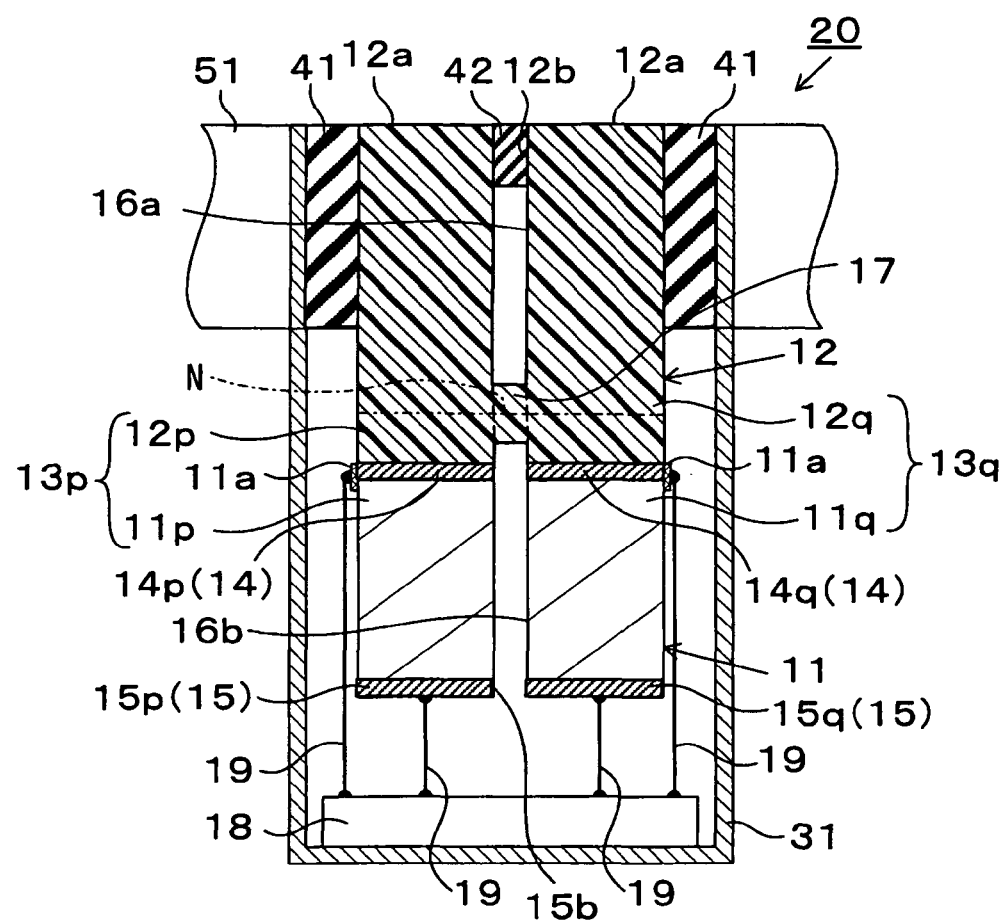
FIG. 4 is a diagram illustrating a cross-sectional view of an ultrasonic sensor according to a modification of the second embodiment.

The ultrasonic sensor 20 can be modified in various ways. For example, as shown in FIG. 4, the ultrasonic detectors 13$p$-13$s$ can be joined together by a node portion of the ultrasonic detectors 13$p$-13$s$. The node portion is a portion where a node N of a standing wave occurring in the ultrasonic detectors 13$p$-13$s$ appears. In the case of FIG. 4, the node portion is located in the acoustic matching member 12. That is, the acoustic matching member 12 has the joint 17. The first clearance 16$a$ does not reach the first electrode 14, and the second clearance 16$b$ extends into the acoustic matching member 12 by penetrating through the first electrode 14. Thus, the joint 17 is located in the acoustic matching member 12 and sandwiched between the first and second clearances 16$a$, 16$b$. The second clearance 16$b$ sections not only the second electrode 15 into the second electrodes 15$p$-15$s$ but also the first electrode 14 into four first electrodes 14$p$-14$s$.

According to the structure of FIG. 4, the ultrasonic detectors 13$p$-13$s$ are joined together by the joint 17 that is located only at the node portion of the ultrasonic detectors 13$p$-13$s$. In such an approach, the joint 17 can hardly affect the ultrasonic wave in the ultrasonic detectors 13$p$-13$s$ so that the detection sensitivity of the ultrasonic sensor 20 can be improved.

Like the ultrasonic sensor 10 according to the first embodiment, the opening 12$b$ is filled with a sealing material 42 having an elasticity coefficient less than an elasticity coefficient of the acoustic matching member 12. Further, in addition to the opening 12$b$, the second clearance 16$b$ can be filled with the sealing material 42. In such an approach, structural strength of the piezoelectric element 11 can be improved.

In summary, the ultrasonic sensor 20 of the second embodiment can have a similar effect to the ultrasonic sensor 10 of the first embodiment. Further, the structure of FIG. 4 can improve the detection sensitivity of the ultrasonic sensor 20.

Third Embodiment

An ultrasonic sensor 30 according to a third embodiment of the present invention is described below with reference to FIG. 5. Differences between the preceding embodiments and the third embodiment are as follows.

Figure 5:
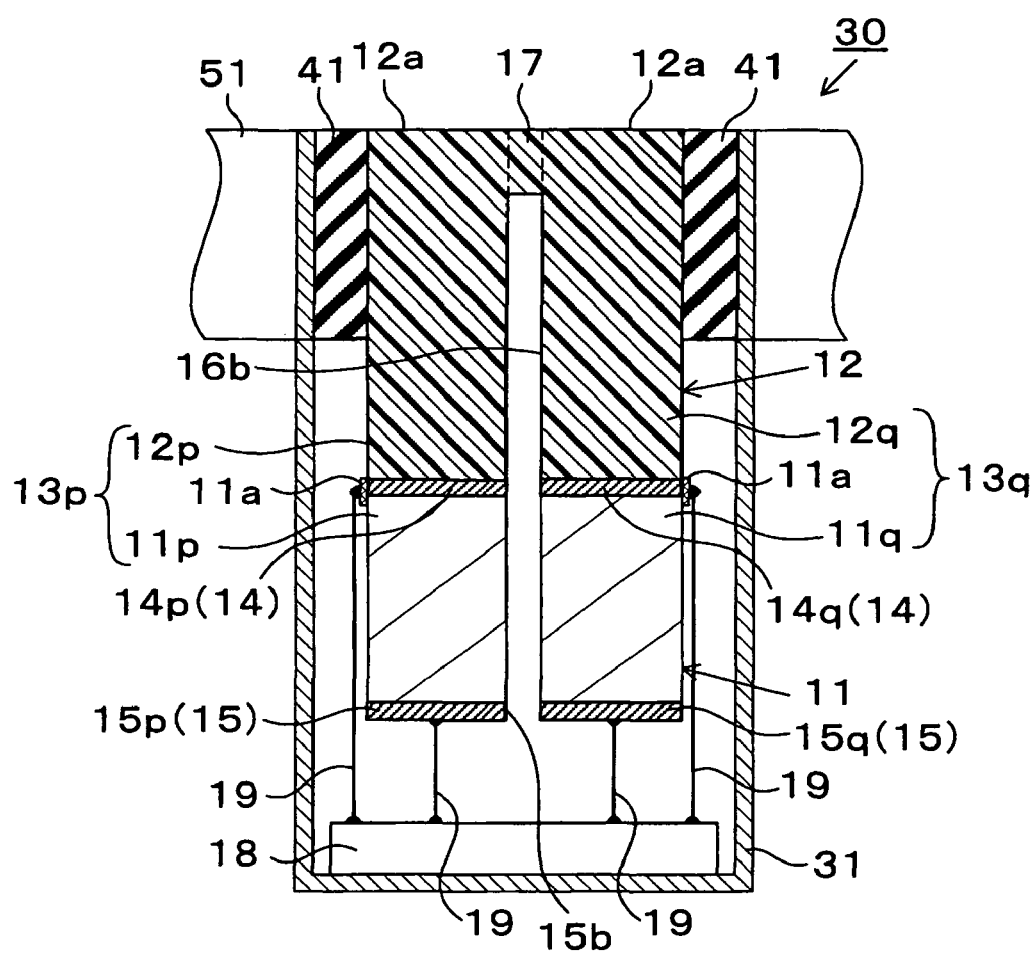
FIG. 5 is a diagram illustrating a cross-sectional view of an ultrasonic sensor according to a third embodiment of the present invention.

As shown in FIG. 5, in the ultrasonic sensor 30 according to the third embodiment, the ultrasonic detectors 13$p$-13$s$ are joined together by an upper portion of the acoustic matching member 12. Thus, the upper portion of the acoustic matching member 12 serves as the joint 17. Specifically, the receiving surface 12$a$ has no opening so that the joint 17 can be formed near the receiving surface 12$a$. The first clearance 16$a$ is not formed, and the second clearance 16$b$ extends to near the receiving surface 12$a$ of the acoustic matching member 12 by penetrating through the first electrode 14. It is preferable that the joint 17 be made as thin as possible to help prevent a vibration reduction and crosstalk in the acoustic matching member 12. For example, the thickness of the joint 17 can be set to 1 millimeter (mm).

In summary, the ultrasonic sensor 30 of the third embodiment can have a similar effect to the ultrasonic sensor 10 of the first embodiment. Further, since the receiving surface 12$a$ of the acoustic matching member 12 has no opening, foreign matter such as water cannot enter the ultrasonic sensor 30. Thus, the ultrasonic sensor 30 can be protected from the foreign matter. Furthermore, a vehicle to which the ultrasonic sensor 30 is mounted can have a good appearance, because the receiving surface 12$a$, which is exposed to an outside of the vehicle, has no opening.

Fourth Embodiment

An ultrasonic sensor 40 according to a fourth embodiment of the present invention is described below with reference to FIG. 6. Differences between the preceding embodiments and the fourth embodiment are as follows.

Figure 6:
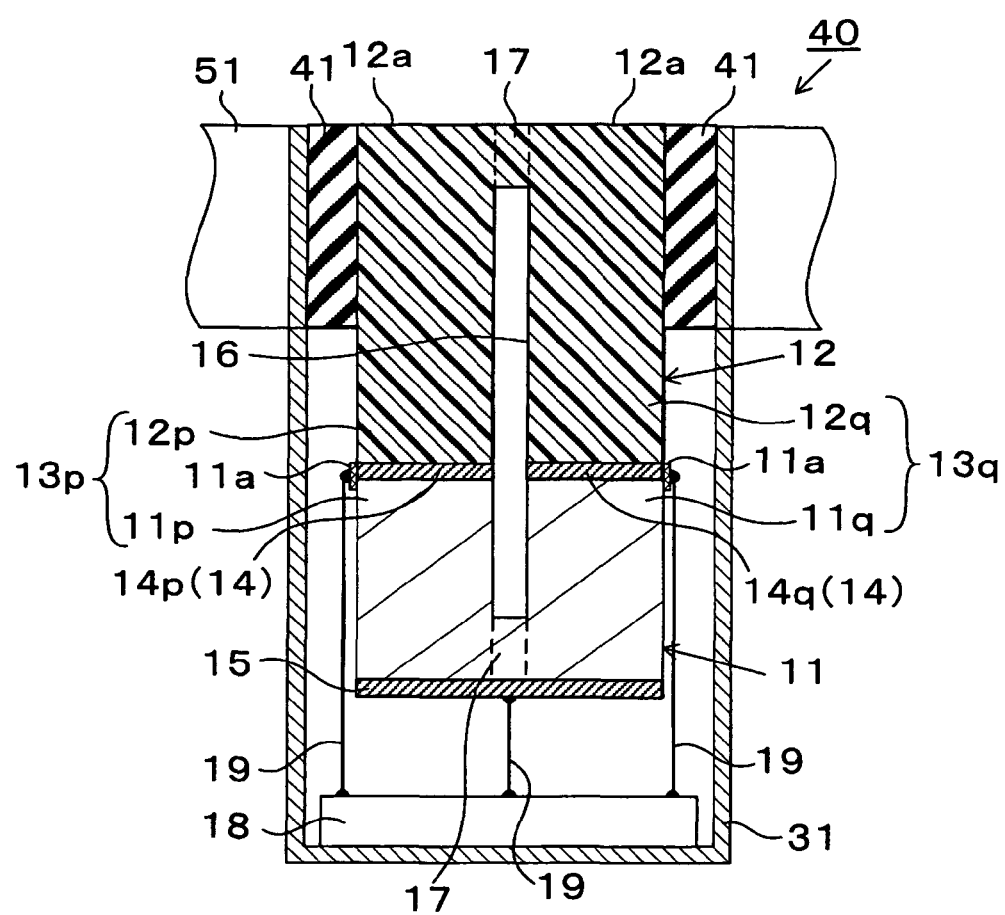
FIG. 6 is a diagram illustrating a cross-sectional view of an ultrasonic sensor according to a fourth embodiment of the present invention.

As shown in FIG. 6, in the ultrasonic sensor 40 according to the fourth embodiment, neither the receiving surface 12$a$ of the acoustic matching member 12 nor the second electrode 15 of the piezoelectric element 11 has opening. Thus, the ultrasonic detectors 13$p$-13$s$ are joined together by both the upper portion of the acoustic matching member 12 and the lower portion of the piezoelectric element 11. Each of the upper portion of the acoustic matching member 12 and the lower portion of the piezoelectric element 11 serves as the joint 17. Therefore, the joint 17 is located near each of the receiving surface 12$a$ and the second electrode 15. The clearance 16 is located in the ultrasonic sensor 40. As mentioned in the third embodiment, it is preferable that the joint 17 located near the receiving surface 12$a$ be made as thin as possible to help prevent a vibration reduction and crosstalk in the acoustic matching member 12. For example, the thickness of the joint 17 located near the receiving surface 12$a$ can be set to 1 mm. Whereas the first electrode 14 is sectioned by the clearance 16 into the first electrodes 14$p$-14$s$, the second electrode 15 is not sectioned. Therefore, the first electrodes 14$p$-14$s$ are respectively provided to the piezoelectric elements 11$p$-11$s$, and the second electrode 15 is shared among the piezoelectric elements 11$p$-11$s$.

Figure 7A:
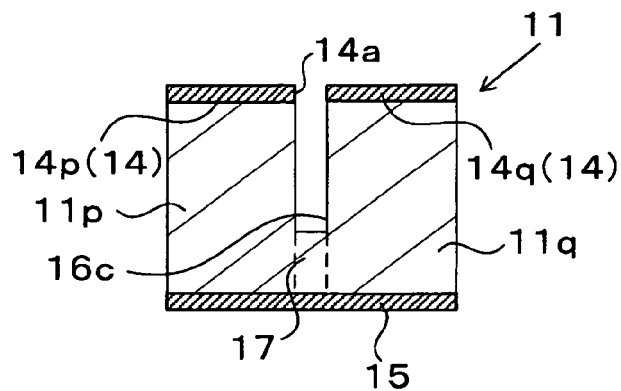
FIGS. 7A-7C are diagrams illustrating a method of making the ultrasonic sensor of FIG. 6.

A method of making the ultrasonic sensor 40 is described below with reference to FIGS. 7A-7C. First, as shown in FIG. 7A, a piezoelectric element 11 having preformed first and second electrodes 14, 15 is prepared. Then, a cross-shaped opening 14$a$ is formed to the first electrode 14, and a slit clearance 16$c$ extending approximately perpendicular to the first electrode 14 is formed by dicing the piezoelectric element 11 along the opening 14$a$. Thus, the piezoelectric element 11 is sectioned by the clearance 16$c$ into four piezoelectric elements 11$p$-11$s$.

Figure 7B:
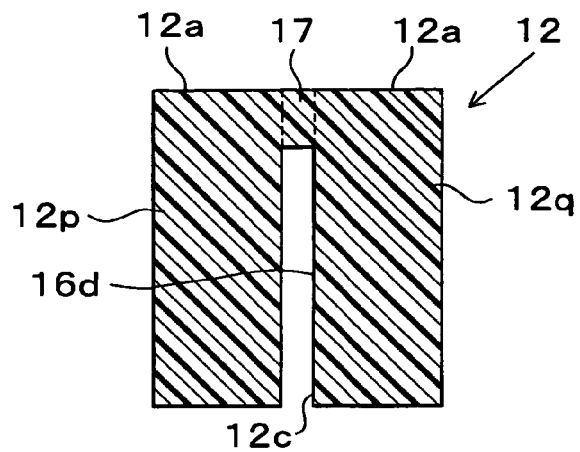

Next, as shown in FIG. 7B, an acoustic matching member 12 is prepared. Then, a cross-shaped opening 12$c$ having the same shape as the opening 14$a$ is formed to a surface opposite to a receiving surface 12$a$, and a slit clearance 16$d$ extending approximately perpendicular to the opposite surface is formed by dicing the acoustic matching member 12 along the opening 12$c$. Thus, the acoustic matching member 12 is sectioned by the clearance 16$d$ into four acoustic matching members 12$p$-12$s$.

Figure 7C:
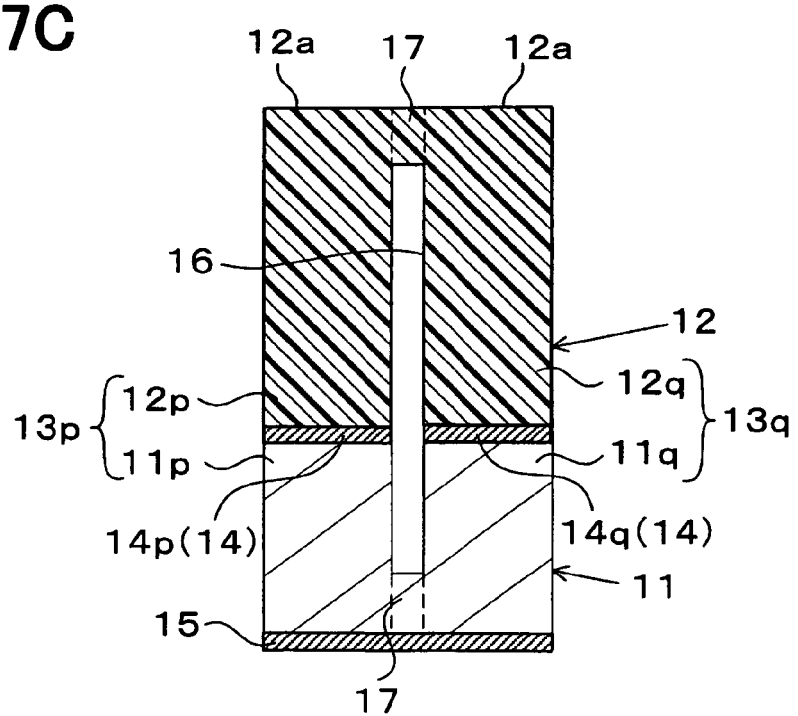

Next, as shown in FIG. 7C, the piezoelectric element 11 and the acoustic matching member 12 are joined together, for example, using an adhesive agent, in such a manner that the opening 14$a$ of the piezoelectric element 11 is aligned with the opening 12$c$ of the acoustic matching member 12. Thus, four ultrasonic detectors 13$p$-13$s$, which are joined together and arranged in an array, are constructed with the piezoelectric element 11 and the acoustic matching member 12.

Finally, the ultrasonic detectors 13$p$-13$s$ are electrically coupled to the circuit device 18 using electrical wires 19. The ultrasonic detectors 13$p$-13$s$ and a circuit device 18 are accommodated in a housing 31. The ultrasonic detectors 13$p$-

13s are fixed to the housing 31 through a vibration isolator 41. In this way, the ultrasonic sensor 40 shown in FIG. 6 is made.

In summary, the ultrasonic sensor 40 of the fourth embodiment can have a similar effect to the ultrasonic sensor 10 of the first embodiment. Further, since the receiving surface 12a of the acoustic matching member 12 has no opening, foreign matter such as water cannot enter the ultrasonic sensor 40. Thus, the ultrasonic sensor 40 can be protected from the foreign matter. Furthermore, a vehicle to which the ultrasonic sensor 40 is mounted can have a good appearance, because the receiving surface 12a, which is exposed to an outside of the vehicle, has no opening.

(Modifications)

Figure 8:
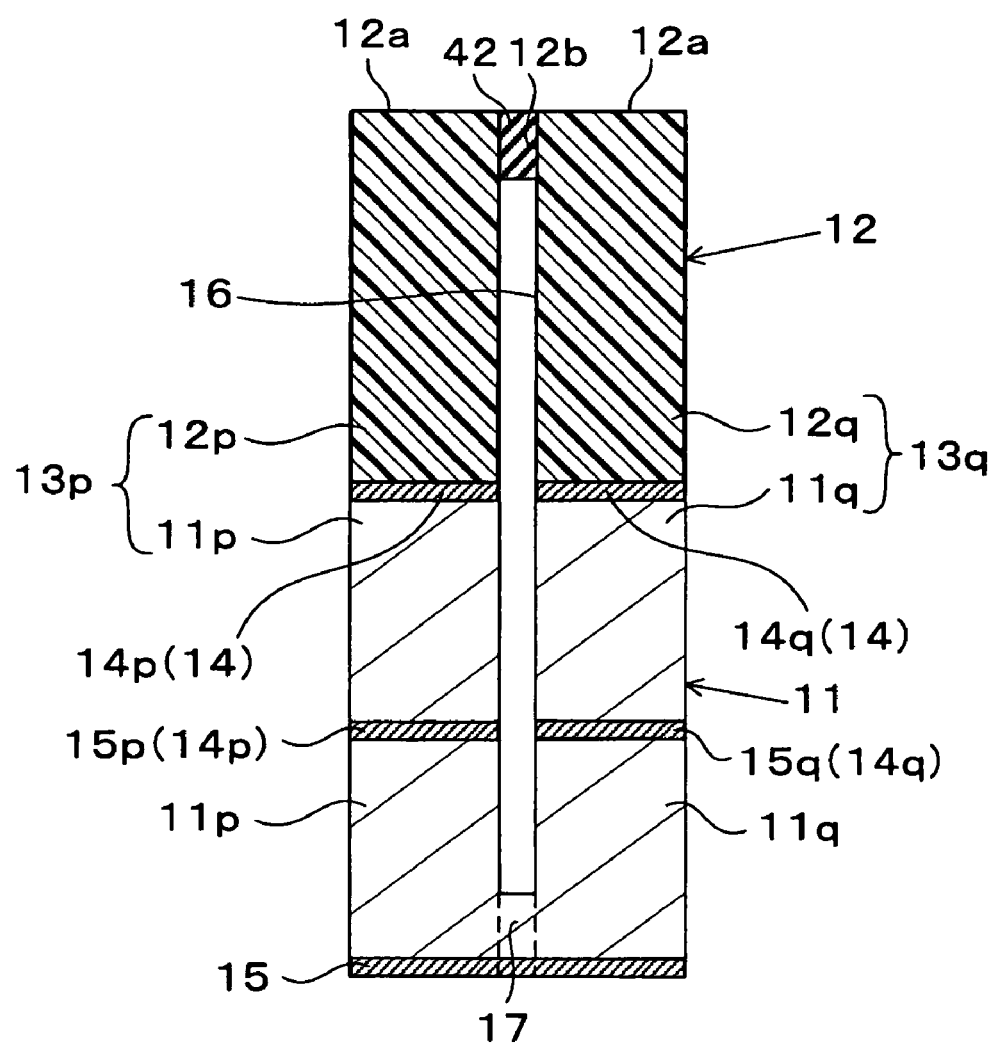
FIG. 8 is a diagram illustrating a cross-sectional view of an ultrasonic sensor according to a modification of the present embodiment.

The embodiments described above may be modified in various ways. For example, the ultrasonic sensor can be configured to transmit an ultrasonic wave. In this case, the ultrasonic sensor can include multiple piezoelectric elements 11 that are stacked together. For example, as shown in FIG. 8, the ultrasonic sensor can include two piezoelectric elements 11 that are stacked together. An electrode located between the stacked piezoelectric elements 11 serves as not only a first electrode 14 of the lower piezoelectric element 11 but also a second electrode 15 of the upper piezoelectric element 11. Each of the stacked piezoelectric elements 11 is sectioned by a clearance 16. The structure of FIG. 8 allows sound pressure of the ultrasonic wave transmitted by the ultrasonic sensor to be increased compared to a structure in which the piezoelectric elements 11 are not stacked.

In the case of FIG. 8, a joint 17 is located at a lower portion of the lower piezoelectric element 11. The location of the joint 17 can vary as mentioned in the preceding embodiments. In the case of FIG. 8, two piezoelectric elements 11 are stacked together. The number of piezoelectric elements 11 stacked together can vary.

Figure 9A:
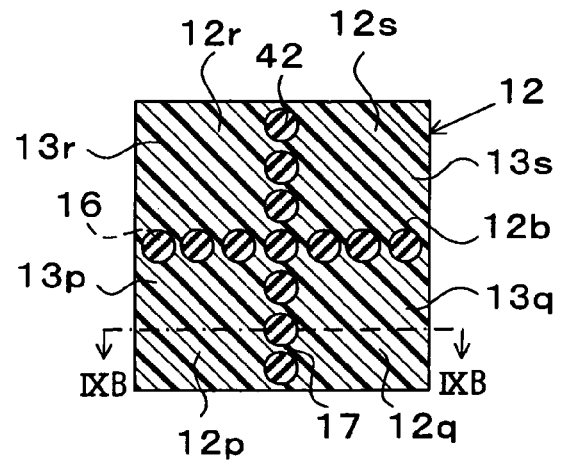
FIG. 9A is a diagram illustrating a top view of an ultrasonic sensor according to another modification of the present invention.
Figure 9B:
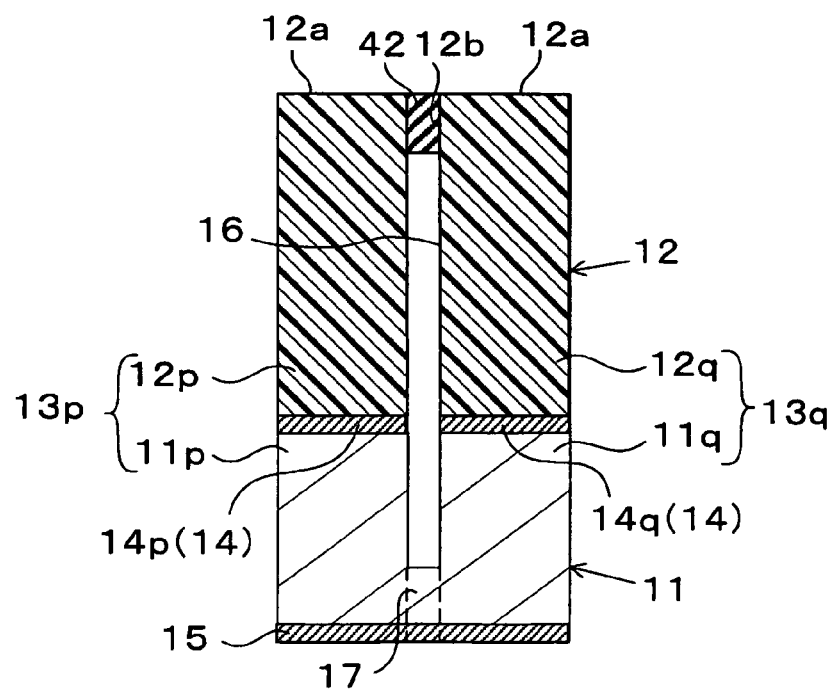
FIG. 9B is a diagram illustrating a cross-sectional view taken along line IXB-IXB of FIG. 9A.

In the preceding embodiments, the shape of the clearance 16 is slit. The shape of the clearance 16 can vary. For example, as shown in FIGS. 9A, 9B, a plurality of circular cylindrical clearances 16 can be arranged in a cross pattern so that the acoustic matching member 12 and the piezoelectric element 11 can be sectioned by the clearances 16 to form four ultrasonic detectors 13p-13s. In such an approach, portions between adjacent clearances 16 also serve as the joint 17 so that the volume of the joint 17 can be increased. Therefore, the structure of FIGS. 9A, 9B allows the strength of the ultrasonic sensor to be increased compared to the structure in which the clearance 16 is slit. Alternatively, cylindrical clearances 16 other than the circular cylindrical clearances 16 can be used. For example, rectangular cylindrical clearances 16 can be used.

In FIGS. 9A, 9B, the circular cylindrical clearances 16 extend from the receiving surface 12a and penetrate through only the first electrode 14. Alternatively, the circular cylindrical clearances 16 can extend from the receiving surface 12a and penetrate through both the first electrode 14 and the second electrode 15. Alternatively, the circular cylindrical clearances 16 can extend from the second electrode 15.

Such changes and modifications are to be understood as being within the scope of the present invention as defined by the appended claims.

What is claimed is:

1. An ultrasonic sensor comprising:
a piezoelectric element configured to detect an ultrasonic wave reflected from a target to be detected, the piezoelectric element including a piezoelectric body and first and second electrodes that are formed on opposite surfaces of the piezoelectric body; and
an acoustic matching member having a mounting surface and a receiving surface opposite to the mounting surface, the first electrode of the piezoelectric element being joined to the mounting surface to form an ultrasonic detector base, the receiving surface being exposed to outside to receive the reflected ultrasonic wave, the acoustic matching member causing the ultrasonic wave received at the receiving surface to propagate to the piezoelectric element,
wherein the ultrasonic detector base is sectioned into a plurality of ultrasonic detectors by a clearance extending in an ultrasonic wave propagation direction,
wherein the ultrasonic wave received at the receiving surface is divided by the clearance and separately detected by the plurality of ultrasonic detectors,
wherein the plurality of ultrasonic detectors is joined together by a joint,
wherein the joint is formed by a portion of the ultrasonic detector base,
wherein the clearance includes first and second clearances that coincide with each other in the ultrasonic wave propagation direction,
wherein first clearance has a first opening on the receiving surface of the acoustic matching member and extends from the first opening toward the second electrode of the piezoelectric element,
wherein the second clearance has a second opening on the second electrode of the piezoelectric element and extends from the second opening toward the receiving surface of the acoustic matching member,
wherein the joint is located only near a node portion of the plurality of ultrasonic detectors, and
wherein a node of the ultrasonic wave propagating through the plurality of ultrasonic detector appears at the node portion.

2. The ultrasonic sensor according to claim 1, wherein one of the first and second electrodes of the piezoelectric element is sectioned by the clearance.

3. The ultrasonic sensor according to claim 1, wherein the clearance is filled with a material having a less elasticity coefficient than the acoustic matching member.

4. The ultrasonic sensor according to claim 1, wherein the clearance penetrates through neither the receiving surface of the acoustic member nor the second electrode of the piezoelectric element.

5. The ultrasonic sensor according to claim 1, wherein a distance between centers of adjacent ultrasonic detectors is approximately equal to one-half of a wavelength of the ultrasonic wave in air.

6. The ultrasonic sensor according to claim 1, wherein the piezoelectric element comprises a plurality of piezoelectric elements that are stacked together in the ultrasonic wave propagation direction.

7. The ultrasonic sensor according to claim 1, wherein the piezoelectric element is made of a lead zirconate titanate-based material.

8. The ultrasonic sensor according to claim 1, wherein the piezoelectric element is made of a polyvinylidene fluoride-based material.

9. An ultrasonic sensor comprising:
a piezoelectric element configured to detect an ultrasonic wave reflected from a target to be detected, the piezoelectric element including a piezoelectric body and first and second electrodes that are formed on opposite surfaces of the piezoelectric body; and
an acoustic matching member having a mounting surface and a receiving surface opposite to the mounting surface, the first electrode of the piezoelectric element being joined to the mounting surface to form an ultrasonic detector base, the receiving surface being exposed to outside to receive the reflected ultrasonic wave, the acoustic matching member causing the ultrasonic wave received at the receiving surface to propagate to the piezoelectric element, wherein the ultrasonic detector base is sectioned into a plurality of ultrasonic detectors by a clearance extending in an ultrasonic wave propagation direction, wherein the ultrasonic wave received at the receiving surface is divided by the clearance and separately detected by the plurality of ultrasonic detectors, wherein the plurality of ultrasonic detectors is joined together by a joint, wherein the joint is formed by a portion of the ultrasonic detector base, and wherein the clearance penetrates through neither the receiving surface of the acoustic member nor the second electrode of the piezoelectric element.

10. The ultrasonic sensor according to claim 9, wherein one of the first and second electrodes of the piezoelectric element is sectioned by the clearance.

11. The ultrasonic sensor according to claim 9, wherein the clearance is filled with a material having a less elasticity coefficient than the acoustic matching member.

12. The ultrasonic sensor according to claim 9, wherein a distance between centers of adjacent ultrasonic detectors is approximately equal to one-half of a wavelength of the ultrasonic wave in air.

13. The ultrasonic sensor according to claim 9, wherein the piezoelectric element comprises a plurality of piezoelectric elements that are stacked together in the ultrasonic wave propagation direction.

14. The ultrasonic sensor according to claim 9, wherein the piezoelectric element is made of a lead zirconate titanate-based material.

15. The ultrasonic sensor according to claim 9, wherein the piezoelectric element is made of a polyvinylidene fluoride-based material.

* * * * *